H. GENTIS.
INCUBATOR.
APPLICATION FILED OCT. 3, 1919.

1,395,955.

Patented Nov. 1, 1921.
4 SHEETS—SHEET 1.

Inventor
Herman Gentis

By Victor J. Evans
Attorney

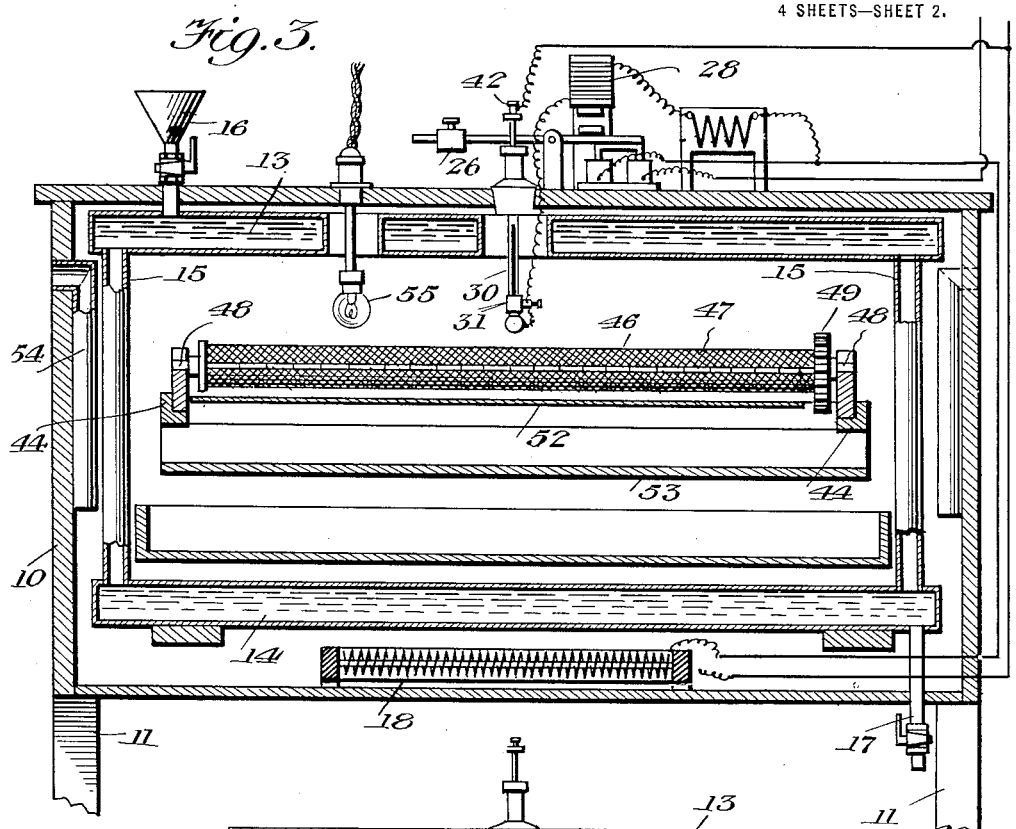
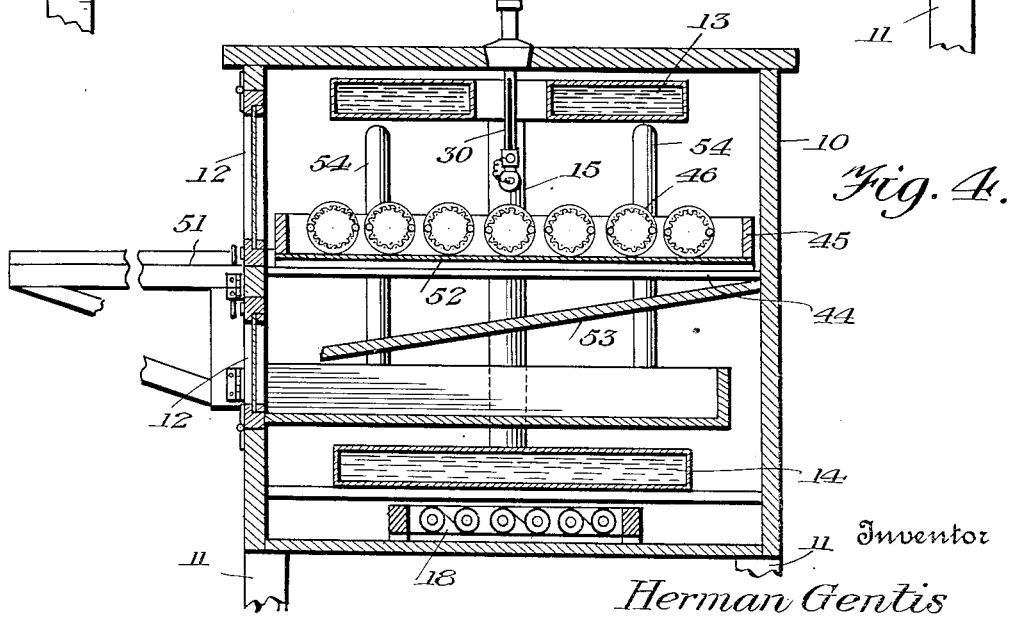

H. GENTIS.
INCUBATOR.
APPLICATION FILED OCT. 3, 1919.
1,395,955.
Patented Nov. 1, 1921.
4 SHEETS—SHEET 3.
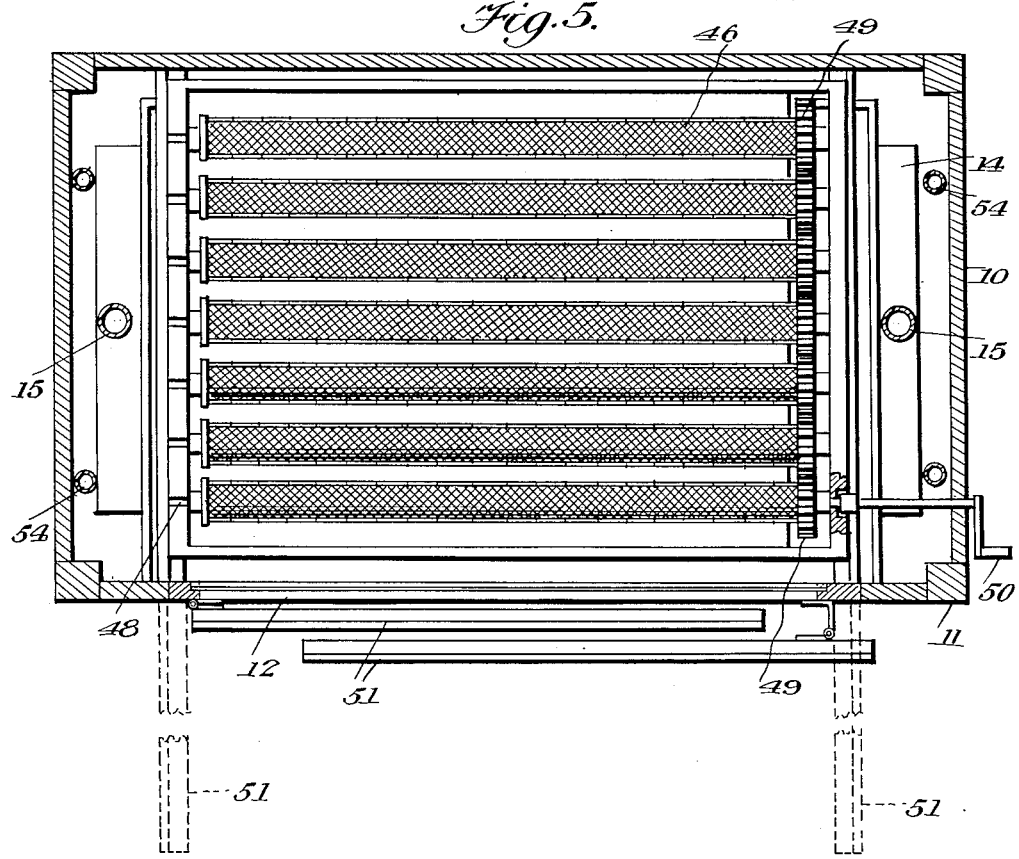
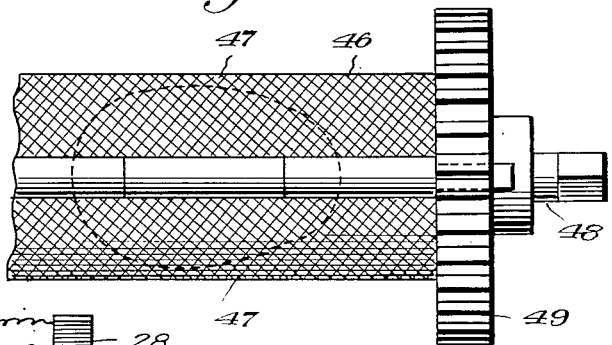
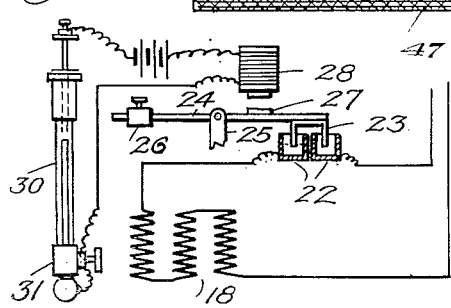
Inventor
Herman Gentis
By Victor J. Evans
Attorney

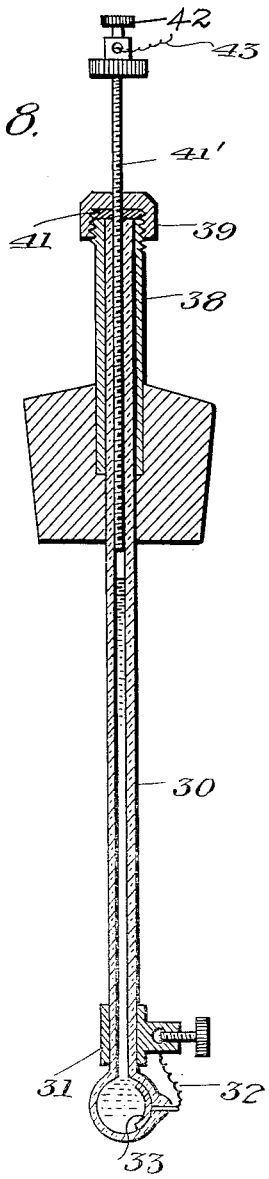
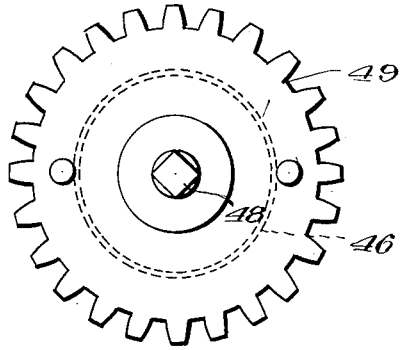
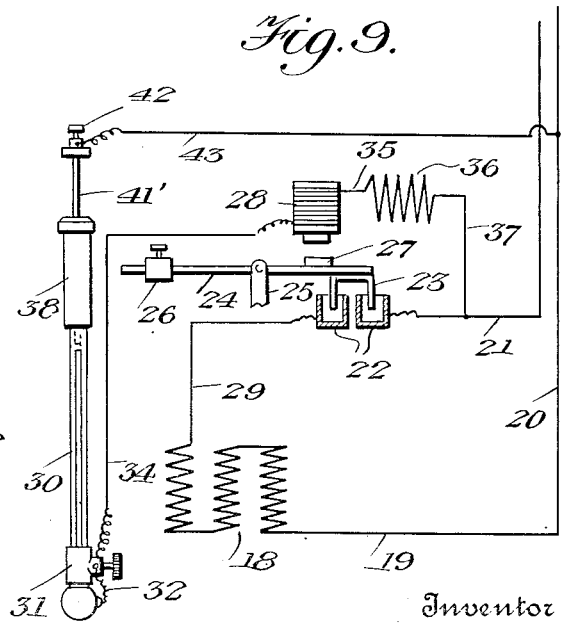

UNITED STATES PATENT OFFICE.

HERMAN GENTIS, OF VICTORIA, BRITISH COLUMBIA, CANADA.

INCUBATOR.

1,395,955.  Specification of Letters Patent.  Patented Nov. 1, 1921.

Application filed October 3, 1919. Serial No. 328,321.

*To all whom it may concern:*

Be it known that I, HERMAN GENTIS, a subject of the Queen of the Netherlands, residing at Victoria, British Columbia, Dominion of Canada, have invented new and useful Improvements in Incubators, of which the following is a specification.

This invention relates to incubators, and has for its principal object the provision of an incubator provided with electrically operated heating means disposed both above and below the egg chamber and provided with a peculiarly constructed thermostatic device for controlling the flow of current into the electric heater whereby the degree of heat may be properly regulated so that the egg chamber wil be maintained at a uniform temperature.

An important object is the provision in an incubator of a current controlling device including a magnetically operated switch for cutting off the current, the energization of the magnet being effected by the closing of a circuit through a stationary contact extending into the bore of a thermometer and making contact with the column of mercury therein when the column of mercury has risen, under the influence of heat, to a certain predetermined point, this stationary contact being adjustable with respect to the column of mercury whereby the magnet controlling circuit may be closed at any desired temperature.

A further object is the provision of an incubator provided with an improved water circulatory system including spaced tanks arranged respectively above and below the egg chamber, this arrangement insuring a uniform distribution of heat throughout the incubator.

A further object is the provision of an incubator provided with a peculiarly constructed egg tray including a plurality of separate tubular egg containers mounted for rotary movement within a support, all the tubular members having connection with one another whereby they may be simultaneously turned so that the eggs contained therein may be properly turned without necessitating their being touched by the hands of the operator.

Another object is the provision of an incubator of this character in which the egg tray may be slid out of the egg chamber and onto supporting brackets mounted on the front of the device whereby the eggs may be properly aired at any desired time.

An additional object is the provision of an incubator of this character in which is provided an inclined board or platform disposed below the egg tray in such position that the newly hatched chicks upon leaving the eggs will fall upon the inclined board and be deposited gently within the exercising chamber without danger of injury caused by a direct fall as in the ordinary construction.

Still another object is the provision of an incubator which will be comparatively simple and inexpensive in manufacture, highly efficient and durable in service and a general improvement in the art.

With the above and other objects and advantages in view, the invention consists in the details of construction to be hereinafter more fully described and claimed, and illustrated in the accompanying drawing in which:—

Fig. 3 is a longitudinal sectional view.

Fig. 4 is a cross sectional view.

Fig. 5 is a horizontal sectional view taken above the egg tray.

Fig. 6 is a detail side elevation of one end of one egg containing member.

Fig. 7 is an end elevation thereof.

Fig. 8 is a longitudinal sectional view of the thermometer controlled circuit closer and Fig. 9 is a diagrammatic view of the electric circuit.

Fig. 10 is a diagrammatic view showing a modified circuit.

Figure 1:
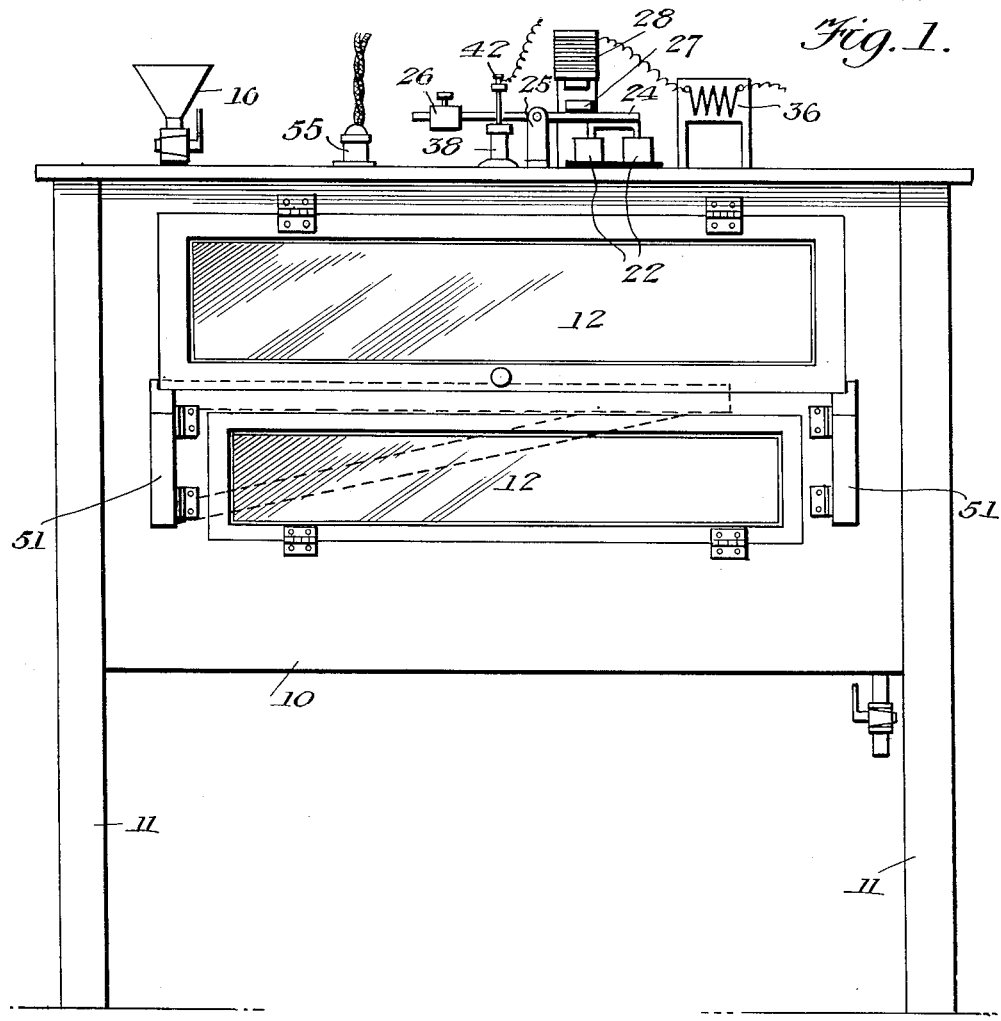
Figure 1 is a front elevation of the complete incubator.
Figure 2:
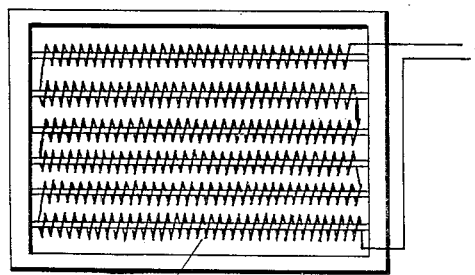
Fig. 2 is a detail view of the heater member.

Referring more particularly to the drawing the numeral 10 designates a rectangular casing preferably mounted upon suitable legs 11 and provided with doors 12 whereby access may be had to the interior.

Disposed within the top and bottom portions of the casing 10 are tanks 13 and 14 respectively which communicate with each other through pipes 15 disposed at the ends of the casing. The upper tank 13 has communicating therewith a valved water supply funnel 16 and the lower tank has communicating therewith a valved outlet pipe 17. The disposition of the tanks 13 and 14 at the top and bottom respectively of the casing 10 insures an even distribution of heat throughout the interior of the casing as will be obvious. Disposed beneath the tank 14 is an electric heater 18 of any ordinary or preferred type. From the heater 18 leads a wire 19 connected with one terminal of a source of current, not shown, by a lead wire 20. The source of current is also connected by a wire 21 with one of a pair of mercury cups 22 within which is movable an inverted U-shaped plunger 23 mounted upon one end of an arm 24 pivoted intermediate its ends upon a bracket 25 secured on top of the casing 10. At its other end, the arm 24 carries an adjustable weight 26 whereby it may be properly balanced. Between its pivot point and the end provided with the inverted U-shaped yoke, the arm 24 carries an armature 27 in position to be acted upon by an electro-magnet 28 suitably supported above the casing 10 and the purpose of which will be made hereinafter apparent. The other mercury cup is connected with the other terminal of the heating coil 18 by a wire 29.

In order that the flow of current through the mercury cups 22 and heater 18 may be automatically controlled, I provide a thermometer 30 extending into the top of the casing 10 and having secured upon its lower end in encircling relation thereto adjacent the bulb a clamping member 31 from which leads a wire 32 sealed into the bulb and connected therewithin with a plate 33, preferably of platinum. The clamping member 31 is connected by a wire 34 with one terminal of the winding of the electro-magnet 28 which has its other terminal connected by a wire 35 with one end of a resistance coil 36 having its other end connected by a wire 37 with the lead wire 21.

Secured upon the upper end of the thermometer 30 is a metallic sleeve 38 upon which is threadedly engaged a cap 39 provided with a central threaded opening. A suitable gasket 41 is interposed between the end of the sleeve 38 and the cap 39 so as to insure a tight joint. Extending within the bore of the thermometer and threaded through the opening 40 is a contact rod 41' upon the upper end of which is carried a binding post 42 to which is connected a wire 43 connected with the lead wire 20.

When the incubator is in use, the rod 41 is so adjusted within the bore of the thermometer that its lower end will be disposed opposite the graduation indicating the maximum temperature which should be reached within the casing 10. Under ordinary conditions, the position of the arm is such that the plunger 23 will be in contact with the mercury contained within the cups 22. Current will then flow from the source through the heating device 18 and the water within the tanks 13 and 14 will be eventually heated. As the temperature within the casing 10 is consequently raised the column of mercury within the thermometer will of course rise correspondingly. When the temperature within the casing reaches the maximum safe degree the top of the column of mercury in the thermometer will engage against the lower end of the contact rod 41 and will close the circuit through the resistance coil 36 and electro-magnet 28, energizing the magnet 28 which will result in attraction of the armature 27, causing the arm 24 to be moved upon its pivot until the plunger 23 has been removed from the cups 22. The circuit through the electric heater will then be broken and will remain broken until the temperature within the casing 10 is such that the column of mercury within the thermometer will drop out of contact with the end of the rod 41, whereupon the magnet 28 will become de-energized and the arm 24 will return to its initial position with the plunger 23 contacting with the mercury in the cups 22. It will therefore be seen that the flow of current through the electric heater will be automatically controlled by the temperature within the casing 10.

In case it should be found inadvisable, for any reason, to employ the same circuit through the heater and the thermometer, I may use a circuit from line wires through the mercury cups and heater and a separate battery circuit through the thermometer and magnet. In such an event, the arrangement of parts will be substantially the same except that the resistance coil would be omitted. The arrangement of separate circuits is shown in Fig. 10.

Slidably mounted upon suitable cleats 44 secured upon the inner sides of the ends of the casing 10 is a rectangular frame 45 within which are mounted cylindrical egg containing members 46 each of which is formed of semi-cylindrical sections 47 hingedly connected at one edge and detachably connected at their other edges so that they may be opened to permit the insertion of eggs therein and the egress of the hatched chicks therefrom. Each cylindrical member 46 is provided at one end with a trunnion 48 rotatable within a corresponding hole in one end of the frame 45. At their other ends, the cylindrical members 46 have secured thereon pinions 49 which mesh with one another as shown so that all the cylindrical members may be partially rotated at one time by rotating a crank handle 50 connected with one end of one of the members. By this construction, it will be seen that all the egg containing members may be rotated to the desired degree simultaneously without any necessity for the operator touching them with his hands. This construction therefore provides a great labor saving in the turning of the eggs.

Secured upon the front wall of the casing 10 are brackets 51 onto which the frame 45 constituting the egg tray may be slid when it is desired to air the eggs. It is of course understood that the uppermost door 12 must be open before the frame 45 can be slid outwardly onto the brackets 51. Disposed beneath the tray 45 is a sheet 52, preferably of felt or other absorbent material, which is adapted to be saturated with water whereby the requisite amount of moisture may be supplied within the casing 10. This sheet is removed when the chicks begin to hatch.

In order that the newly hatched chicks may be prevented from falling when leaving the egg containing members, I provide an inclined platform 53 disposed below the frame 45 in such position that the chicks upon leaving the egg containing members will fall upon the inclined platform and be conducted thereby without injury into the space below the frame 45, this space constituting the exercising chamber.

In order that fresh air may be supplied into the interior of the casing 10, I provide a plurality of ventilator pipes 54 which are disposed adjacent the end walls of the casing on the interior thereof and which have their upper ends communicating with the atmosphere as shown. Furthermore, in order that the interior of the casing 10 may be inspected when desired, I provide an electric light bulb 55 disposed above the tray 45.

From the foregoing description and a study of the drawings it will be apparent that I have thus provided an incubator which is electrically heated, which is provided with automatic means whereby the flow of current through the electric heater will be controlled by the temperature within the incubator, and in which danger of overheating will be consequently prevented. It will also be apparent that I have provided an extremely simple form of egg containing members which are provided with means whereby they may be simultaneously rotated without any necessity for touching the eggs with the hands, the construction of the incubator and egg tray being such that the tray may be slid out of the casing for airing purposes. A careful inspection of the drawings will also reveal the fact that I have improved the construction of incubators in general in the matter of the water circulatory system inasmuch as I have provided tanks above and below the egg tray so that the degree of heat will be kept uniform throughout the device.

While I have shown and described the preferred embodiment of the invention, it will of course be readily understood that I reserve the right to make such changes in the form, construction and arrangement of parts as will not depart from the spirit of the invention nor the scope of the subjoined claims.

Having thus described my invention I claim:—

1. In an incubator, an electric heater, a thermometer, an adjustable contact disposed within the bore of said thermometer and adapted to be contacted with by the column of mercury therein, said heater being included in a circuit with a source of current, and an electro-magnetically controlled switch interposed in said circuit and connected with the column of mercury in said thermometer and with said contact member, said switch comprising a pair of spaced mercury cups, a pivoted lever, an inverted U-shaped member carried by the lever and dipping into said cups, an adjustable counter-balancing weight on said lever, and an armature on the lever attractable by said magnet.

2. In an incubator, an electric heater, a thermometer having a mercury column, a contact member extending into the bulb of said thermometer and contacting with the mercury therein, a second contact member extending into the bore of said thermometer and engageable by the column of mercury therein, said heater being included in a circuit including a source of current, a normally closed switch interposed in said circuit, and an electro-magnet positioned to open said switch, said magnet being included in a circuit including said first and second named contact course of current.

In testimony whereof I affix my signature.

HERMAN GENTIS.